United States Patent [19]
Yazaki et al.

[11] Patent Number: 4,751,120
[45] Date of Patent: Jun. 14, 1988

[54] POLYESTER VESSEL HAVING IMPROVED DIMENSION STABILITY AND PROCESS FOR PREPARATION THEREOF

[75] Inventors: Jinichi Yazaki, Tokyo; Kozaburo Sakano, Kawasaki, both of Japan

[73] Assignee: Toyo Seikan Kaisha, Ltd., Tokyo, Japan

[21] Appl. No.: 14,255

[22] Filed: Feb. 11, 1987

Related U.S. Application Data

[62] Division of Ser. No. 788,212, Oct. 16, 1985, Pat. No. 4,687,689.

[30] Foreign Application Priority Data

Oct. 16, 1984 [JP] Japan .................. 59-215238
Nov. 16, 1984 [JP] Japan .................. 59-240510

[51] Int. Cl.$^4$ .................. B65D 23/08; B65D 3/06
[52] U.S. Cl. .................. 428/35; 428/482; 428/475.2; 427/44; 427/54.1
[58] Field of Search ............. 428/35, 483, 482, 475.2; 215/1 C; 427/44, 54.1

[56] References Cited

U.S. PATENT DOCUMENTS

| 4,264,658 | 4/1981 | Tobias et al. | 428/35 |
| 4,273,799 | 6/1981 | Kamada et al. | 427/44 |
| 4,339,474 | 7/1982 | Kishida et al. | 427/44 |
| 4,370,368 | 1/1983 | Hirata et al. | 428/35 |
| 4,504,531 | 3/1985 | Murata et al. | 428/35 |
| 4,569,869 | 2/1986 | Kushida et al. | 428/35 |

Primary Examiner—John E. Kittle
Assistant Examiner—James J. Seidleck
Attorney, Agent, or Firm—Sherman and Shalloway

[57] ABSTRACT

In a thermoplastic polyester, a compound having at least two ethylenically unsaturated groups and/or oxirane rings in one molecule is coated as a crosslinking agent on the outer surface of the polyester substrate, or a polyester composition containing this crosslinking agent is laminated on the polyester substrate as the inner surface layer, and the crosslinking agent or the crosslinking agent-containing polyester composition is irradiated with ionizing radiant rays or ultraviolet rays. In this processed vessel, the dimension stability and rigidity are highly improved, and deformation under heat and/or pressure can be effectively prevented.

14 Claims, 3 Drawing Sheets

Fig. 2
Fig. 3
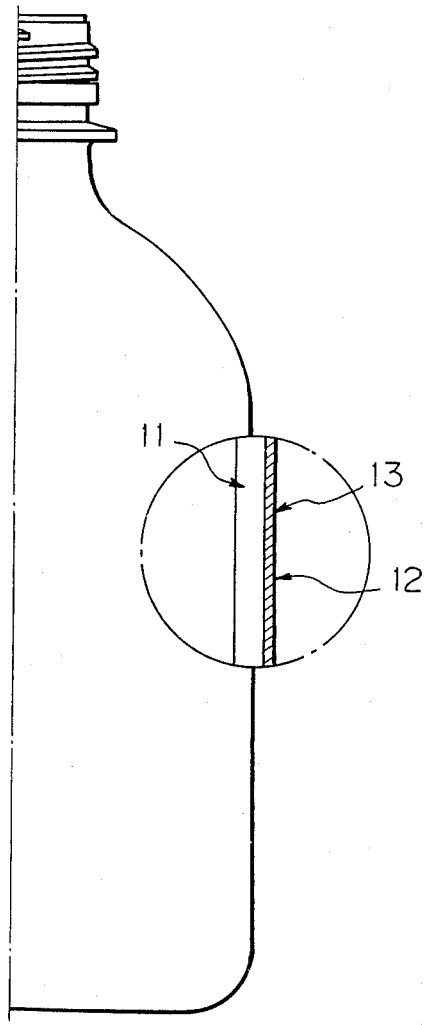
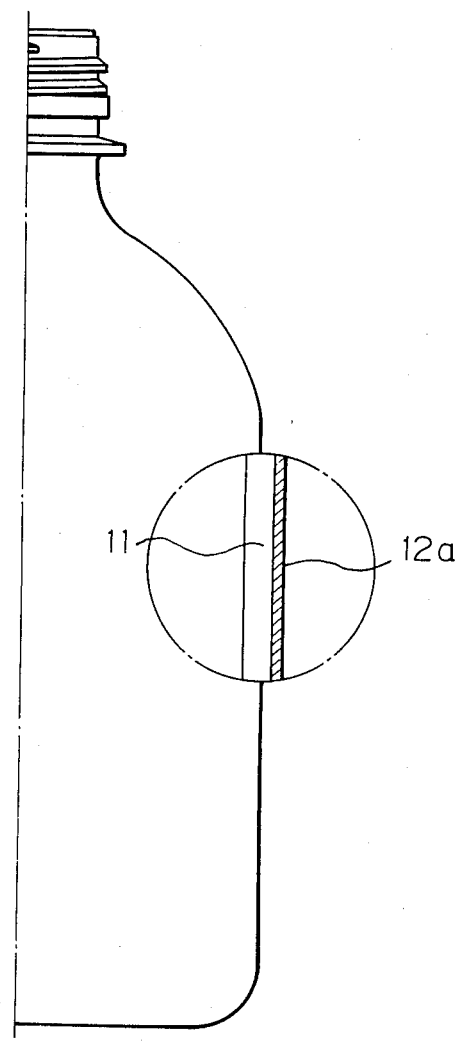

POLYESTER VESSEL HAVING IMPROVED DIMENSION STABILITY AND PROCESS FOR PREPARATION THEREOF

This is a division of application Ser. No. 788,212, filed Oct. 16, 1985, now U.S. Pat. No. 4,687,689.

BACKGROUND OF THE INVENTION (1) Field of the Invention

The present invention relates to a polyester vessel having an improved dimension stability. More particularly, the present invention relates to a polyester vessel having an excellent dimension stability and a good appearance characteristic, in which deformation at a high temperature or under a high pressure or vacuum is prevented.

(2) Description of the Prior Art

A vessel obtained by forming a bottomed preform of the amorphous state from a thermoplastic polyester such as polyethylene terephthalate and stretch-drawing the bottomed preform in the axial direction at a drawing temperature of the polyester while blow-drawing the preform in the circumferential direction is excellent in such properties as transparency, impact resistance, gas barrier property, rigidity and pressure resistance, as disclosed in the specification of U.S. Pat. No. 3,733,309, and this vessel is widely used as packaging vessels for various liquids.

However, a polyester vessel of this type is still insufficient in the heat resistance. For example, when the vessel is allowed to stand still in an atmosphere maintained at 60° to 70° C. for 3 to 5 minutes, a volume shrinkage of 1 to 3% is observed, and at a higher temperature, the vessel is thermally deformed to such an extent that the vessel cannot be practically used. This tendency is prominent in the neck portion where the polyester is substantially unoriented and in the amorphous state. More specifically, in the neck portion of the vessel, a screw portion or step portion is formed so as to engage a lid member with the vessel tightly and produce assured sealing, and if this screw portion or step portion has no sufficient rigidity or is poor in the dimension stability, a desirable sealing pressure cannot be maintained.

Various proposals have heretofore been made to heat-set a draw-blown vessel for eliminating the above defects, as shown, for example, in Japanese Patent Application Laid-Open Specifications No. 82366/76, No. 107357/76, No. 78268/78, No. 78267/78, No. 71/79 and No. 41973/79. However, these proposals are still insufficient because the obtained heat stabilizing effect is relatively low and troublesome treatments are necessary.

As means for improving the rigidity and dimension stability of the neck portion of the vessel, there is known a method in which the amorphous neck portion is whitened (crystallized) by a heat treatment, as disclosed in Japanese Patent Application Laid-Open Specification No. 53566/76. According to this method, however, only the neck portion is whitened and the transparency is lost in the neck portion, resulting in reduction of the commercial value.

Furthermore, there is known a method in which a polyester vessel is irradiated with radiant rays, as disclosed in Japanese Patent Application Laid-Open Specification No. 53-125184. However, no satisfactory improvement of the dimension stability is attained only by irradiation with radiant rays.

SUMMARY OF THE INVENTION

It is therefore a primary object of the present invention to provide a polyester vessel in which the heat resistance or pressure resistance is prominently improved and the above defects of the conventional techniques are eliminated.

Another object of the present invention is to provide a polyester vessel in which the heat resistance is prominently improved by chemical means.

Still another object of the present invention is to provide a polyester vessel in which the heat resistance, hot water resistance and pressure resistance are improved without degradation of excellent properties inherently possessed by the polyester vessel, such as high transparency.

In accordance with one fundamental aspect of the present invention, there is provided a polyester vessel formed of a thermoplastic polyester and having an improved heat resistance, which comprises a polymerized crosslinked layer of a compound having at least two ethylenically unsaturated groups and/or oxirane rings in one molecule or a prepolymer thereof on the outer surface in which deformation under heat and pressure is to be prevented.

In accordance with another aspect of the present invention, there is provided a process for the preparation of polyester vessels having an improved dimension stability, which comprises coating as a crosslinking agent a compound having at least two ethylencially unsaturated groups and/or oxirane rings in one molecule or a prepolymer thereof on the outer surface of a vessel formed of a thermoplastic polyester in which deformation under heat and pressure is to be prevented, and irradiating the crosslinking agent-coated polyester vessel with ionizing radiant rays or ultraviolet rays to effect polymerization and curing of the crosslinking agent layer.

In accordance with still another aspect of the present invention, there is provided a multi-layer polyester vessel formed of a thermoplastic polyester and having an improved dimension stability, which comprises a laminate including an inner surface layer formed of a thermoplastic polyester and a layer formed on the outer side of said inner surface layer, said outer layer being composed of a crosslinked product of a composition comprising a thermoplastic polyester and a compound having at least two ethylenically unsaturated groups and/or oxirane rings in one molecule or a prepolymer thereof.

In accordance with still another aspect of the present invention, there is provided a process for the preparation of multi-layer polyester vessels, which comprises forming a preform comprising a laminate having a layer of a thermoplastic polyester and a layer of a composition comprising a thermoplastic polyester and a compound having at least two ethylenically unsaturated groups and/or oxirane rings in one moleucle, draw-forming said laminate preform into a vessel so that the thermoplastic polyester layer is located on the inner surface side of the vessel and the composition layer is located on the outer side of the thermoplastic polyester layer, and irradiating the formed vessel with ionizing radiant rays or ultraviolet rays to effect crosslinking of the composition layer.

BRIEF DESCRIPTION OF THE DRAWINGS

FIG. 2 is a sectional side view showing an example of the sectional wall structure of the polyester vessel shown in FIG. 1, in which a layer of a polymerized and cured crosslinking agent is formed on the outer side.

FIG. 3 is a sectional side view showing another example of the sectional wall structure of the polyester vessel shown in FIG. 1, in which a layer of a crosslinking agent-containing polyester composition is formed on the outer side.

DETAILED DESCRIPTION OF THE PREFERRED EMBODIMENTS

Figure 1:
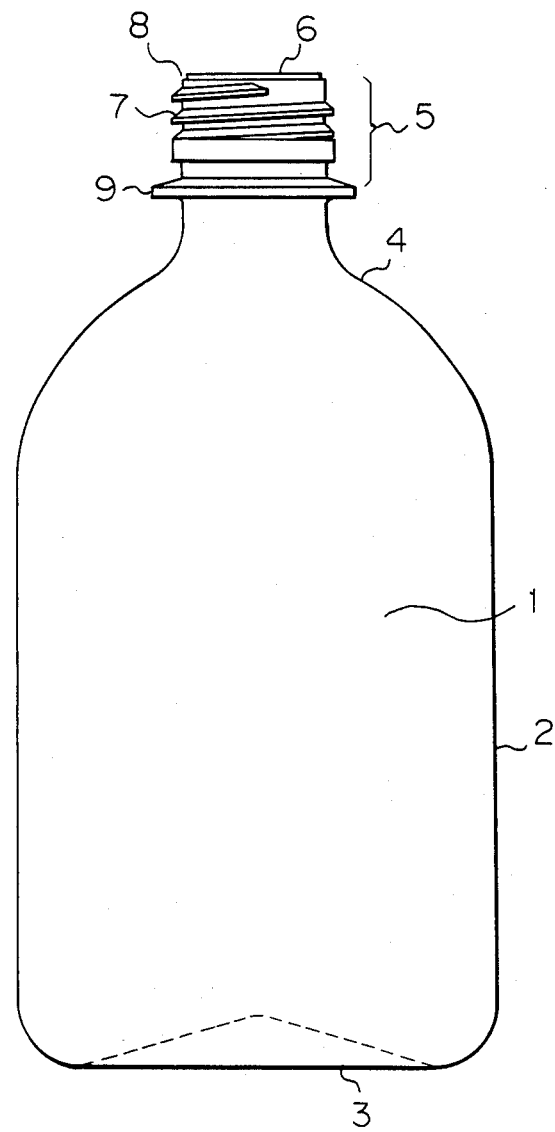
FIG. 1 is a side view showing an example of the polyester vessel according to the present invention.

In the present invention, the outer surface of the vessel in which deformation under heat and pressure is to be prevented may be an optional place on the outer surface of the vessel. For example, this place may be the entire outer surface of the vessel. In the case where reduction of the self-supporting property by deformation of the bottom should be prevented, this place may be the bottom portion, or if the volume shrinkage of the barrel portion should be controlled, this place may be the barrel portion. Furthermore, in the case where deformation of the neck portion or insuffient rigidity of the neck portion should be prevented, this place may be the neck portion.

The polyfunctional compound used in the present invention has such a property that the polyfunctional compound is readily polymerized and crosslinked by the action of ionizing radiant rays, a chemical initiator or ultraviolet rays. In accordance with one embodiment of the present invention, a layer of this polymerized and crosslinked product is formed on the outer surface of the polyester vessel in which deformation under heat and pressure is to be prevented, whereby the rigidity and dimension stability of this portion are highly improved and the defect of thermal deformation is effectively eliminated. In this case, since a mutual action such as grafting or entanglement of molecular chains is ordinarily caused between the polymerized and crosslinked layer of the above-mentioned compound and the base polyester layer, the improvement of the above characteristics becomes more prominent. Furthermore, the present invention is advantageous in that the polymerized and crosslinked layer present on the outer surface of the polyester substrate may be very thin. The obtained improving effect is very prominent and inherent excellent properties of the polyester, such as transparency and gas barrier property, are not degraded at all.

Moreover, the treatment of the present invention comprises coating of the above-mentioned compound on the outer surface of the polyester substrate and polymerizing crosslinking conducted for a short time, and the present invention is advantageous in that the treatment can be accomplished very simply.

In accordance with another embodiment of the present invention, the inner surface portion of the vessel is formed of an ordinary thermoplastic vessel and a layer of a polyester composition containing the above-mentioned polyfunctional compound is formed thereon, whereby the rigidity, dimension stability, resistance to deformation under heat and pressure resistance can be highly improved.

Furthermore, the present invention is advantageous in that the crosslinked layer present on the outer surface of the polyester substrate may be very thin, and the obtained improving effect is very prominent and inherent excellent properties of the polyester, such as transparency and gas barrier property, are not degraded at all.

In this latter embodiment of the present invention, by effecting crosslinking of the polyester by the polyfunctional compound, that is, the crosslinking agent, by irradiation with ionizing radiant rays or ultraviolet rays, premature crosslinking can be prevented at the step of heat-forming a multi-layer preform or draw-forming the multi-layer preform, and furthermore, after formation of the vessel, crosslinking of the crosslinking agent-containing polyester layer can be effectively accomplished in a short time.

The present invention will now be described in detail.

POLYESTER VESSEL

By the term "thermoplastic polyester vessel" used in the present invention is meant a packaging vessel formed from a thermoplastic polyester or a mixture of a thermoplastic polyester with other thermoplastic resin such as high-gas-barrier thermoplastic resin by heat forming, draw forming or a combination thereof.

Polyethylene terephthalate (PET) is preferably used as the thermoplastic polyester in the present invention. However, a copolyester comprising ethylene terephthalate units as main units and other polyester units may be used, so far as the inherent properties of polyethylene terephthalate are not degraded. As the comonomer component used for the copolyester, there can be mentioned dicarboxylic acid components such as isophthalic acid, p-$\beta$-hydroxyethoxybenzoic acid, naphthalene-2,6-dicarboxylic acid, diphenoxyethane-4,4'-dicarboxylic acid, 5-sodiumsulfoisophthalic acid, adipic acid, sebasic acid and alkyl ester derivatives thereof, and glycol components such as propylene glycol, 1,4-butanediol, neopentyl glycol, 1,6-hexylene glycol, cyclohexane dimethanol, an ethylene oxide adduct of bisphenol A, diethylene glycol and triethylene glycol.

The thermoplastic polyester should have a film-forming molecular weight, and in view of the mechanical strength of the vessel, it is preferred that the inherent viscosity ($\eta$) of the thermoplastic polyester be at least 0.01 l/g, especially at least 0.05 l/g, as measured in a phenol/tetrachloroethane mixed solvent having a weight ratio of 50/50 at a temperature of 30° C.

The vessel may be prepared by heat forming such as extrusion forming, injection forming, molten sheet forming or melt blow forming. In the present invention, a draw-formed vessel is especially advantageous. The draw-formed vessel is a vessel obtained by forming the above-mentioned polyester or a combination of the polyester with a gas barrier resin such as an ethylene/vinyl alcohol copolymer into a vessel at a drawing temperature of the polyester, ordinarily 85° to 115° C., by blow forming, draw-blow forming, vacuum forming, plug assist forming, air pressure forming, compression forming, draw forming, draw-iron forming, bulge forming or impact forming. This forming method is advantageous in that by utilizing the effect of orienting the polyester molecule, the transparency, mechanical strength and air permeation resistance can be improved.

An especially preferred vessel is a vessel obtained by forming an amorphous bottomed preform by injection forming or extrusion pre-blow forming and drawing the preform in a blow mold at a drawing temperature in the axial direction while expansion-drawing the preform in the circumferential direction (loop direction).

Referring to FIG. 1 illustrating a preferred example (bottle) of the vessel, this bottle 1 comprises a barrel portion 2, a bottom portion 3 continuous to the lower end of the barrel portion, a frustoconical shoulder portion 4 continuous to the top end of the barrel portion and a neck portion 5 (nozzle portion) continuous to the top end of the shoulder portion. The polyester constituting the barrel portion 2 of the bottle 1 is molecularly oriented biaxially, that is, in the axial and circumferential directions of the bottle, by draw-blow forming. The neck portion 5 (nozzle portion) of the bottle 1 has an opening 6 on the top end and an engaging, screwing or anchoring portion to be attached to a lid, such as a screw 7 or an engaging step 8, on the periphery thereof. Furthermore, a support ring 9 is formed to support the bottle at the filling and sealing steps. The polyester constituting the neck portion 5 is in the substantially unoriented state, and the shoulder portion 4 between the neck and barrel portions is composed of a completely oriented polyester or the biaxially oriented state is gradually changed to the unoriented state toward the neck portion from the barrel portion. In the bottom portion 3, the biaxially oriented state is gradually changed to the unoriented state toward the center from the periphery.

Referring to FIG. 2 which is an enlarged view of an example of the sectional structure of the wall of the bottle 1, the bottle wall comprises a polyester substrate 11 and a layer 12 of a polymerized and crosslinked product of a compound having at least two ethylenically unsaturated groups and/or oxirane rings in one molecule or a prepolymer thereof (hereinafter referred to as "crosslinking agent"), which is formed on the outer surface of the substrate 11. In the interface 13 between the substrate 11 and the polymerized and crosslinked product 12, the molecule chains of both the substrate and the polymerized and crosslinked product are mingled with each other, or a graft linkage is formed in some case.

Referring to FIG. 3 which is an enlarged view of another example of the sectional structure of the wall of the bottle 1, the bottle wall comprises a polyester substrate 11 and a layer 12a of a crosslinked product of a composition comprising a polyester and a compound having at least two ethylenically unsaturated groups and/or a prepolymer thereof (hereinafter referred to as "crosslinking agent"), which is formed on the outer surface of the substrate 11.

Figure 4:
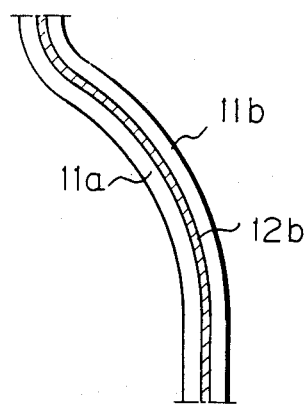
FIG. 4 is a sectional partial view showing still another example of the sectional wall structure of the polyester vessel shown in FIG. 1, in which a layer of a crosslinking agent-containing polyester composition is formed as an intermediate layer.
Figure 5:
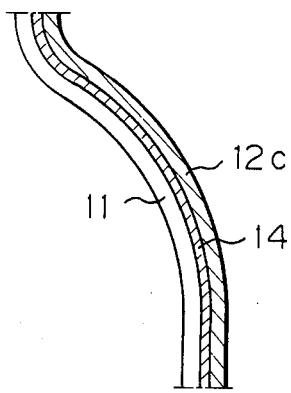
FIG. 5 is a sectional partial view showing still another example of the sectional wall structure of the polyester vessel shown in FIG. 1, in which a layer of a crosslinking agent-containing polyester composition is formed on the outer side of a layer of an ethylene/vinyl alcohol copolymer.

The laminate structure of the bottle wall is not limited to the above-mentioned structure. For example, a laminate structure comprising an inner surface layer 11a of a polyester, an outer surface layer 11b of a polyester and a layer 12b of a crosslinked product of a crosslinking agent-containing polyester, which may be interposed between the layers 11a and 11b, as shown in FIG. 4, may be adopted, or a laminate structure comprising an inner surface layer 11 of a polyester, a gas barrier intermediate layer 14 of an ethylene/vinyl alcohol copolymer having a vinyl alcohol content of 40 to 80 mole%, which is formed on the outer side of the layer 11, and a layer 12c of a crosslinked product of a crosslinking agent-containing polyester, which is formed as the outermost layer, as shown in FIG. 5, may be adopted. In short, an optional multi-layer laminate structure may be adopted in the present invention, so far as the polyester is present on the inner surface side and the layer of the crosslinked product of the crosslinking agent-containing polyester is present on the outer side of the polyester layer.

CROSSLINKING AGENT

The crosslinking agent used in the present invention is a compound having at least two polymerizable ethylenically unsaturated groups and/or oxirane rings in one molecule.

Preferred examples of the crosslinking agent are described below, though crosslinking agents that can be used are not limited to those exemplified below.

(i) Divinyl compounds such as divinylbenzene.

(ii) Allyl compounds represented by the following general formula:

R—OCH$_2$CH=CH$_2$)$_n$ wherein R stands for an organic compound having a valency of 2 to 4, and n is a number of 2 to 4, such as diallyl phthalate (DAP), diallyl isophthalate, diallyl adipate, diallyl glycolate, diallyl maleate, diallyl sebacate, triallyl phosphate, triallyl aconitate, allyl trimellitate and allyl pyromellitate.

(iii) Acrylic compounds represented by the following general formula:

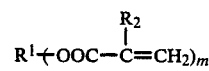

$$R^1(\!-\!OOC-\underset{|}{\overset{R_2}{C}}\!=\!CH_2)_m$$

wherein $R^1$ stands for an organic group having a valency of 2 to 6, $R^2$ stands for a hydrogen atom or a methyl group, and m is a number of 2 to 6, such as 1,6-hexanediol diacrylate (HDDA), 1,6-hexanediol dimethacrylate (HDDMA), neopentyl glycol diacrylate, neopentyl glycol dimethacrylate, ethylene glycol diacrylate (EGDA), ethylene glycol dimethacrylate (EGDMA), polyethylene glycol diacrylate (PEGA), polyethylene glycol dimethacrylate (PEGMA), polypropylene diacrylate, polypropylene glycol dimethacrylate, butylene glycol diacrylate, butylene glycol dimethacrylate, pentaerythritol diacrylate, 1,4-butanediol diacrylate, trimethylolpropane triacrylate, trimethylolpropane trimethacrylate, pentaerythritol triacrylate, dipentaerythritol hexaacrylate, tetramethylolmethane tetraacrylate and N,N,N',N'-tetrakis($\beta$-hydroxyethyl)ethylene-diamine acrylate.

(iv) Allyl-acrylic compounds such as allyl acrylate and allyl methacrylate.

(v) Acrylamide compounds such as N,N'-methylene-bisacrylamide and N,N'-methylene-bis-methacrylamide.

(vi) Oxirane compounds represented by the following general formula:

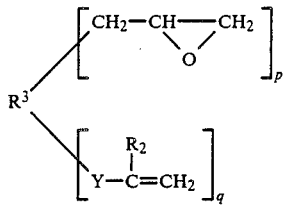

wherein $R^3$ stands for an organic group having a valency of p+q, $R^2$ stands for a hydrogen atom or a methyl group, and p and q are positive integers with the proviso that p is an integer of at least 1 and the sum of p and q is at least 2, such as allyl glycidyl ether, glycidyl methacrylate, glycidyl 2-methylacrylate, glycidyl 2-butylacrylate, glycidyl crononate, 2,2-bis(3-allyl-4-glycidyloxyphenyl)propane, 1,1-bis(3-allyl-4-glycidyloxyophenyl)cyclohexane, (2-allylphenyl)-glycidyl ether, (2,6-diallylphenyl)glycidyl ether, 1,4-diglycidyloxy-2,6-diallylbenzene, 2,2-bis(3,5-diallyl-4-glycidyloxyphenyl)propane, (2,4,6-triallylphenyl)glycidyl ether, 3,3'-diallyl-4,4'-diglycidyloxybenzophenone, bis(3-allyl-4-glycidyloxyphenyl)-ether and bis(3,5-diallyl-4-glycidyloxyphenyl)sulfone.

(vii) Prepolymers derived from the above-mentioned components (i) through (vi) and prepolymers having at least two ethylenically unsaturated groups.

As examples of the latter prepolymers, there can be mentioned polyurethane acrylate, epoxy acrylate, polyether acrylate and polyester acrylate.

These crosslinking agents may be used singly or in the form of a mixture of two or more of them. Furthermore, the crosslinking agent may be used in combination with a monofunctional monomer for formation of the layer of the polymerized and crosslinked product. For example, triallyl cyanurate or diallyl phthalate, which is a solid crosslinking agent, may be used in the state dissolved in other liquid crosslinking agent or monofunctional monomer.

Preferred examples of the monofunctional monomer are acrylic acid (AAc), methacrylic acid (MAAc), methyl acrylate (MA), methyl methacrylate (MMA), ethyl acrylate (EA), ethyl methacrylate (EMA), butyl acrylate (BA), butyl methacrylate (BMA), hexyl acrylate, 2-ethylhexyl acrylate, 2-ethylhexyl methacrylate, isooctyl acrylate, lauryl methacrylate, 2-hydroxyethyl acrylate (HEA), 2-hydroxyethyl methacrylate (HEMA), 2-hydroxypropyl acrylate, 2-hydroxypropyl methacrylate, 3-chloro-2-hydroxypropyl methacrylate, N,N'-dimethylaminoethyl acrylate, N,N'-dimethylaminoethyl methacrylate, N,N'-diethylaminoethyl acrylate, N,N'-diethylaminoethyl methacrylate, glycidyl acrylate (GA), glycidyl methacrylate (GMA), carbitol acrylate, tetrahydrofurfuryl acrylate, tetrahydrofurfuryl methacrylate, dicyclopentadienyl acrylate, dihydrodicyclopentadienyl methacrylate, isobonyl acrylate, acrylamide (AAm), methacrylamide (MAm), N-methlolacrylamide (N-MAM), N-diacetone-acrylamide (DAAM), N-vinylpyrrolidone, maleic acid, itaconic acid, styrene (ST), acrylonitrile (AN), vinyl acetate (VAc) and vinyltoluene (VT), though monomers that can be used are not limited to those exemplified above.

COATING OF CROSSLINKING AGENT

In accordance with the first embodiment of the present invention, the above-mentioned coating agent is coated on the outer surface of a polyester vessel in which deformation under heat or pressure is to be prevented. The thickness of this coating layer is not particularly critical. However, the present invention is prominently characterized in that the effect of preventing deformation under heat and pressure can be attained even with such a small thickness of the coating layer as 1 to 50 μm, especially 5 to 30 μm.

In the case where the crosslinking agent or crosslinking agent composition is a liquid having an appropriate viscosity, it may be coated without dilution, or in the case where the crosslinking agent is a liquid having a high viscosity or a semi-solid, it may be coated after dilution with a known solvent such as a hydrocarbon solvent or an ether type solvent. Known coating means such as dip coating, roller coating, spray coating, brush coating or electrostatic coating may be adopted.

The coating agent or coating agent composition coated on the polyester substrate may be immediately polymerized and cured. However, it is preferred that polymerization and curing be effected after the surface layer of the polyester substrate has become sufficiently compatible with the crosslinking agent or crosslinking agent composition. Among the above-mentioned crosslinking agents, those having an aromatic ring or ester group have an especially good compatibility with a polyester. It has been found that in the state where the crosslinking agent component is compatible with the polyester or the surface layer of the polyester is somewhat swollen with the crosslinking agent, grafting of the crosslinking agent to the polymer chain of the polyester is efficiently advanced. In order to render the crosslinking agent well compatible with the surface layer of the polyester, it is preferred that the surface layer of the polyester be contacted with the crosslinking agent or crosslinking agent composition at a temperature of 50° to 80° C. for 0.5 to 5 minutes before the polymerizing and curing operation.

CROSSLINKING AGENT-CONTAINING POLYESTER COMPOSITION AND FORMATION OF SAID COMPOSITION INTO MULTI-LAYER POLYESTER VESSEL

According to the second embodiment of the present invention, the above-mentioned crosslinking agent is incorporated into a thermoplastic polyester, and this composition is laminated with a crosslinking agent-free polyester. The crosslinking agent should be incorporated into a thermoplastic polyester in an amount sufficient to introduce a crosslinked structure enough to impart a sufficient dimension stability to the thermoplastic polyester. It is preferred that the crosslinking agent be incorporated in an amount of 0.1 to 20 parts by weight, especially 0.5 to 10 parts by weight, per 100 parts by weight of the thermoplastic polyester. If the amount of the crosslinking agent is too small and below the above range, the crosslinked structure cannot be sufficiently introduced in the molecule chains of the polyester. If the amount of the crosslinking agent is too large and exceeds the above range, the layer of the composition becomes brittle after the crosslinking.

It is preferred that the thermoplastic polyester and the crosslinking agent be uniformly kneaded before the preparation of a vessel or a preform for formation of a vessel. This kneading operation may be accomplished in a kneading apparatus such as a roll mixer, a Banbury mixer or a kneader. In general, however, there are adopted a method in which both the components are supplied into a blender or an injection machine and melt-kneaded, and a method in which the crosslinking agent is added to the polyester being kneaded in an extruder or injection machine.

According to this embodiment of the present invention, a preform of a laminate comprising a layer of the thermoplastic polyester and a layer of a crosslinking agent-containing polyester composition is formed. The preform of the laminate may be a bottomed cylindrical preform used for draw-blow forming, or a disk-like preform used for plug assist forming, air pressure forming or draw forming.

Formation of the multi-layer preform may be accomplished by adopting a lamination technique such as coextrusion, coinjection, multi-staged injection, extrusion coating or hot pressing of film layers. In the coextrusion method, two extruders are arranged for extrusion of the polyester and extrusion of the crosslinking agent-containing polyester, and two molten resin streams are extruded in the form of a pipe, parison or sheet through a multi-layer multi-ply die. For production of a bottomed preform, the above-mentioned pipe is rapidly cooled and cut into a predetermined size, and a mouth portion is formed by compression forming and a closed bottom portion is formed by bottoming, or the extruded parison is subjected to blow forming in a split mold to form a bottomed preform. In the coinjection method, a cylinder for injection of the polyester and a cylinder for injection of the crosslinking agent-containing polyester are used, and resin streams are injected into an injection mold to form a bottomed cylindrical or disk-like preform. In the multi-staged injection method, a primary preform composed solely of the polyester is formed, the primary preform is inserted in a second injection mold and the crosslinking agent-containing polyester is injected on the outer surface of the primary preform to form a final preform.

The multi-layer preform as described above is draw-formed into a vessel in which the polyester layer is located on the inner surface side of the vessel and the layer of the crosslinking agent-containing polyester composition is located on the outside of the polyester layer. In this draw forming, the preform is maintained at a drawing-possible temperature, and the preform is drawn at least in the axial direction so that molecular orientation is caused in the polyester. For example, in case of a bottomed cylindrical preform, this preform is stretched and drawn in the axial direction and simultaneously blow-drawn in the circumferential direction to form a bottle-shaped vessel. In case of a disk-like preform, the preform is formed into a cup-shaped vessel or a wide-mouth bottle by such means as plug assist forming, air pressure forming or draw forming.

It is preferred that the drawing temperature be 85° to 115° C., especially 90° to 110° C. In case of a biaxially drawn bottle, it is preferred that the draw ratio in the axial direction be 1.5 to 3, especially 1.8 to 2.2, and the draw ratio in the circumferential direction be 1.5 to 3, especially 2 to 2.5. In case of a monoaxially drawn cup-shaped vessel or wide-mouth bottle, it is preferred that the draw ratio of the barrel portion (the draw ratio determined from the thickness) be 2 to 10, especially 3 to 6.

POLYMERIZATION AND CURING

According to the present invention, in the so-formed vessel, polymerizing curing of the crosslinking agent or crosslinking of the crosslinking agent-containing polyester composition is effected by using a chemical catalyst or by irradiation with ionizing radiant rays or ultraviolet rays. By adopting such initiating means, crosslinking can be performed efficiently after formation of the vessel while controlling crosslinking of the composition at the vessel-forming step. Crosslinking, that is, curing, with radiant rays such as electron beams is especially preferred.

A special chemical such as an initiator need not be used in the curing method using radiant rays such as electron beams, and in this method, the curing time is short and curing can be performed at a low temperature. Accordingly, the polyester substrate is hardly influenced by heat. Furthermore, it is sufficient if only the necessary portion is irradiated and an energy-saving effect can be attained, and the characteristics of the polymerized and cured film are excellent.

As the electron beam source, there is used an electron beam accelerator having an acceleration voltage of 100 to 3000 KV. For example, there may be optionally used a Van de Graaff scanning apparatus, a curtain type apparatus, an electrocurtain type apparatus or the like. The irradiation dose differs according to the kind of the crosslinking agent and the coating thickness. Ordinarily, the irradiation dose is selected in the range of 0.1 to 40 Mrad, especially 5 to 30 Mrad, so that a desired degree of crosslinking is attained.

The crosslinking reaction by the crosslinking agent used in the present invention is a radical reaction. If the crosslinking agent-containing polyester composition is irradiated with electron beams, radicals are generated in the polyester chain and/or the crosslinking agent through excitation or ionization of the molecules. These radicals react with the crosslinking agent to advance grafting, growth of the chain and crosslinking, and the molecule chains are formed into a network structure and curing is caused. In case of irradiation with electron beams, the dose rate is high and hence, the energy is high, and the radical concentration is high. Accordingly, crosslinking curing is rapidly advanced and polymerizing curing is completed in a moment. Furthermore, the obtained cured film has an exceedingly high degree of crosslinking, and a very excellent dimension stability is imparted to the vessel and deformation under high heat or high pressure can be prevented.

Other irradiation conditions may be changed within broad ranges. For example, the dose rate may be changed within the range of 0.01 to 50 Mrad/sec, and the irradiation temperature may be appropriately changed but room temperature is ordinarily sufficient. An irradiation time of less than 1 second is ordinarily sufficient. Since crosslinking curing is a radical reaction, it is preferred that irradiation be carried out in an inert atmosphere of nitrogen or the like. However, in the case where the crosslinking agent-containing polyester composition is not exposed to air (the composition is present as the intermediate layer), irradiation may be carried out in air.

From the viewpoint of the operation easiness, it is preferred that polymerizing curing be accomplished by irradiation with electron beams, but gamma rays from a radioisotope such as cobalt 60 or cesium 137 may be used as radiant rays.

An important polymerizing curing method next to the irradiation with electron beams is a curing method using ultraviolet rays. In this case, a photopolymerization initiator is incorporated into the crosslinking agent or the crosslinking agent-containing polyester composition in advance, and the resulting crosslinking agent composition containing the initiator or the polyester composition containing the crosslinking agent and initiator is irradiated with ultraviolet rays.

As the photopolymerization initiator, there is preferably used an aromatic carbonyl compound such as benzophenone, methoxybenzophenone, acetophenone, benzyl, benzoyl, benzoin ethyl ether, benzyldimethylketal or ethylene-bis(benzoylbenzamide). Of course, all of known photopolymerization initiators can be used, and initiators that can be used in the present invention are not limited to those exemplified above. It is sufficient if the photopolymerization initiator is used in a so-called catalytic amount, and it is preferred that the photopolymerization initiator be used in an amount of 0.01 to 20 parts by weight, especially 0.1 to 10 parts by weight, per 100 parts by weight of the crosslinking agent or the crosslinking agent-containing polyester composition.

Any of light sources emitting ultraviolet rays can be used for photopolymerizing curing. For example, there may be used a high-pressure mercury lamp, a low-pressure mercury lamp, a hydrogen discharge tube, a xenon discharge tube and an arc lap.

Irradiation with ultraviolet rays may be carried out in air, and room temperature is sufficient. In order to promote the polymerizing curing reaction, the crosslinking agent-coated polyester or the crosslinking agent-containing polyester composition layer may be heated at a temperature of 40° to 80° C. The time of irradiation with ultraviolet rays differs according to the output of the light source and the kind of the crosslinking agent. However, in many cases, it is sufficient if the light exposure is conducted for several seconds. In the process of the present invention, since such a small thickness as 1 to 50 $\mu$m is sufficient for the crosslinking agent layer or the layer of the crosslinking agent polyester composition, the polymerizing curing reaction by ultraviolet rays can be performed very efficiently. This is another advantage attained by the present invention.

Furthermore, the polymerizing curing reaction of the crosslinking agent may be accomplished by using a chemical polymerization initiator, that is, a radical polymerization initiator. As the polymerization initiator, there may be used peroxides such as benzoyl peroxide, lauroyl peroxide, cumene hydroperoxide and di-tert-butyl peroxide, and azo compounds such as 2,2-azobisisobutyronitrile. It is preferred that the initiator be used in an amount of 0.01 to 20 parts by weight, especially 0.1 to 10 parts by weight, per 100 parts by weight of the crosslinking agent or the crosslinking agent-containing polyester composition. The polymerizing crosslinking reaction of the crosslinking agent by the initiator is performed at a temperature of 50° to 120° C. for several minutes to scores of minutes.

In the first embodiment of the present invention, coating of the crosslinking agent and polymerizing curing may be perfomed not only on a formed polyester vessel but also on a preform to be formed into a final vessel. For example, in case of a biaxially draw-blow-formed bottle-shaped vessel, there may be adopted a method in which a neck portion having the same dimension and shape as those of the neck portion of a final vessel is formed on a preform and coating of the crosslinking agent and polymerizing curing are performed on the neck portion of the preform, whereby the dimension stability and rigidity of the outer surface of the neck portion of the final vessel are highly improved.

CHARACTERISTICS OF PROCESSED VESSEL

In the processed vessel according to the present invention, by forming a layer of a polymerized and cured product of a crosslinking agent, that is, a compound having at least two ethylenically unsaturated groups and/or oxirane rings in one molecule, on the outer surface of a polyester or by forming a layer of a polyester crosslinked by a crosslinking agent, that is, a compound having at least two ethylenically unsaturated groups and/or oxirane ring in one molecule on the outside of a polyester, the dimension stability is highly improved and deformation under heat or pressure is effectively prevented.

For example, when an ordinary biaxially drawn polyester bottle is immersed in boiling water at 100° C., the volume shrinkage is about 30% and the contour is greatly deformed. In contrast, if the crosslinked layer is formed on the outer surface of this bottle according to the present invention, the volume shrinkage is less than 5% and deformation of the contour is not observed at all. When the buckling pressure of the bottom portion of a bottle filled with water maintained at 80° C. is measured, it is found that this buckling pressure is about 10 kg/cm$^2$ gauge in case of an ordinary polyester bottle, but the buckling pressure is higher than 20 kg/cm$^2$ gauge, especially higher than 40 kg/cm$^2$ gauge, in case of a bottle processed according to the present invention. When a metal cap is fixed to the neck portion of the bottle and the sealing pressure resistance is measured at a temperature of 95° C., it is found that leaking is caused under a pressure of 1 kg/cm$^2$ in case of the unprocessed bottle but the sealing state is maintained even under a pressure of 10 kg/cm$^2$ in the bottle having the periphery of the neck portion processed according to the present invention.

In the present invention, this improvement of the characteristics can be attained in the state where the thickness of the polymerized and crosslinked layer is as small as 1 to 50 $\mu$m, especially 10 to 30 $\mu$m. The reason is that the crosslinking agent is radical-polymerizable and the molecule chains of the polyester are highly crosslinked with the crosslinking agent, and a network structure is formed. The fact that the layer is highly crosslinked is proved by the fact that the gel porportion of this layer is at least 80%, especially at least 90%, and by the fact that in the infrared absorption spectrum of this layer, the characteristics absorption attributed to the C—C double bond or the oxirane ring is hardly observed or this absorption is much smaller than the absorption in the original crosslinking agent.

The present invention will now be described in detail with reference to the following examples that by no means limit the scope of the invention.

EXAMPLE 1

A preform (bottomed parison) having a mouth diameter of 20 mm, a length of 120 mm and a thickness of 4.0 mm was prepared from chips of polyethylene terephthalate having an intrinsic viscosity of 0.8 by the injection forming method. The preform was heated at about 100° C. and held in a mold, and the preform was drawn in the longitudinal direction at a draw ratio of about 2 and then expanded in the lateral direction by blowing air under a pressure of 20 kg/cm² to stick the preform closely to the inner surface of the mold. The drawn product was rapidly cooled and taken out from the mold to obtain a draw-blown vessel having an inner volume of 1010 cc and a weight of 36 g.

The obtained vessel was dipped in a solution of epoxy acrylate in divinylbenzene and heated at 50° C. in an oven. The divinylbenzene layer (crosslinking agent layer) had a thickness of 10 μm. The vessel was irradiated with electron beams at 5.0 Mrad by using a scanning type electron beam irradiation apparatus having an electron beam acceleration voltage of 200 KV. The irradiated vessel had no opacity and the transparency was good. The heat resistance and pressure resistance of the vessel were determined according to the methods described below. For comparison, the draw-blown vessel not irradiated with electron beams (Comparative Example 1) and the crosslinking layer-free draw-blown vessel irradiated with electron beams at 5.0 Mrad (Comparative Example 2) were similarly tested.

(1) Heat Resistance

The vessel was filled with water maintained at a predetermined temperature and the vessel was allowed to stand still for 30 seconds. Then, water was discharged and the volume was compared with the volume before filling of water, and the volume shrinkage was calculated according to the following formula:

$$\text{Volume shrinkage (\%)} = \frac{\text{(volume before filling)} - \text{(volume after filling)}}{\text{(volume before filling)}} \times 100$$

The obtained results are shown in Table 1.

TABLE 1

| Filling Temperature (°C.) | Volume Shrinkage (%) | | |
|---|---|---|---|
| | Example 1 | Comparative Example 1 | Comparative Example 2 |
| 50 | 0.0 | 0.1 | 0.1 |
| 70 | 0.5 | 1.7 | 1.5 |
| 80 | 2.7 | 8.2 | 7.9 |
| 90 | 10.1 | 29.8 | 30.1 |

(2) Compression Strength

Water maintained at a predetermined temperature was charged in the vessel having a notch in the mouth portion to the shoulder portion, and the vessel was allowed to stand still in this state for 30 seconds. Then, the buckling strength (kg/cm²) of the vessel was measured at a compressing speed of 50 mm/min by using a Tensilon tester. The obtained results are shown in Table 2.

TABLE 2

| Filling Temperature (°C.) | Buckling Strength (kg/cm²) | | |
|---|---|---|---|
| | Example 1 | Comparative Example 1 | Comparative Example 2 |
| normal temperature(20° C.) | 25.3 | 25.3 | 25.3 |
| 50 | 25.2 | 22.6 | 22.5 |
| 70 | 22.1 | 14.3 | 14.1 |
| 80 | 18.8 | 6.4 | 6.1 |
| 90 | 13.0 | measurement impossible | measurement impossible |

(3) Pressure Resistance

The inner pressure of the vessel was maintained at a predetermined level for about 5 seconds by water maintained at a predetermined temperature by using a water pressure pump and the vessel was allowed to stand still for 15 seconds. The reduced pressure was restored over a period of 5 seconds, and the change of the volume was examined and the volume expansion ratio was calculated according to the following formula:

$$\text{Volume expansion ratio} = \frac{\text{(volume after application of inner pressure)} - \text{(volume under atmospheric pressure)}}{\text{(volume under atmospheric pressure)}} \times 100$$

The obtained results are shown in Table 3.

TABLE 3

| | Inner Pressure of vessel (kg/cm²) | Volume Expansion Ratio (%) | | | |
|---|---|---|---|---|---|
| | | Filling Temperature | | | |
| | | 20° C. | 50° C. | 70° C. | 80° C. |
| Example 1 | 1.0 | 0.3 | 0.8 | 1.6 | 3.6 |
| | 4.0 | 0.7 | 1.5 | 2.8 | 6.1 |
| | 8.0 | 1.1 | 3.0 | 7.8 | 12.5 |
| Comparative Example 1 | 1.0 | 0.3 | 1.5 | 31.0 | measurement impossible |
| | 4.0 | 1.2 | 4.3 | 52.0 | measurement impossible |
| | 8.0 | 3.1 | 7.8 | measurement impossible | measurement impossible |
| Comparative Example 2 | 1.0 | 0.3 | 1.4 | 30.5 | measurement impossible |
| | 4.0 | 1.2 | 4.4 | 55.0 | broken |
| | 8.0 | 3.0 | 8.0 | broken | broken |

EXAMPLE 2

A bottomed parison (preform) having a mouth diameter of 25.0 mm, a length of 120 mm and a thickness of 4 mm was prepared from chips of polyethylene terephthalate having an intrinsic viscosity of 0.65 according to the injection forming method. The preform was heated at 105° C. and held in a mold heated at 120° C. the preform was drawn in the longitudinal direction at a draw ratio of about 2 and was then expanded in the lateral direction by blowing air under a pressure of 20 kg/cm² to stick the preform closely to the inner surface of the mold. Heat setting was conducted for several seconds in this state, followed by rapid cooling. The drawn product was taken out from the mold to obtain a draw-blown vessel having an inner volume of 1012 cc and a weight of 38 g.

Divinylbenzene was coated on the mouth portion of the obtained vessel and the coated vessel was heated in an oven maintained at 50° C. The coating thickness was about 20 μm.

Then mouth portion of the vessel was irradiated with electron beams at 10.0 Mrad by using a scanning type electron beam irradiation apparatus having an electron beam acceleration voltage of 300 KV.

The irradiated mouth portion was transparent with no whitening, and no incompatibility was observed between the mouth portion and the barrel portion with respect to the transparency.

The heat resistance of the mouth portion was determined according to the method described below. For comparison, the heat resistance of the mouth portion not irradiated with electron beams (Comparative Example 3) was similarly tested.

MEASUREMENT METHOD

Each of the irradiated vessel and the non-irradiated vessel was hot-packed with water maintained at 85° C., and the change of the dimension of the mouth portion was examined after the lapse of 1 minute and the compression strength of the mouth portion alone was measured.

Figure 6:
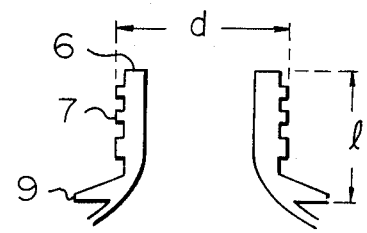
FIG. 6 is a diagram illustrating the change of the dimension in Example 2.
Figure 7:
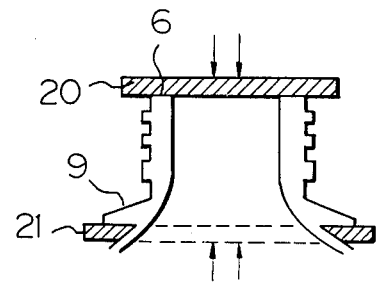
FIG. 7 is a diagram illustrating the method for measuring the compression strength in Example 2.

Incidentally, the change of the dimension of the mouth portion was examined with respect to the outer diameter d of the screw 7 of the mouth portion and the distance l between the opening 6 and the support ring 9 in FIG. 6. Furthermore, the compression strength was determined by gripping the opening 6 and support ring 9 by compressing plates 20 and 21 and applying the compressive force in the direction of the arrow in FIG. 7.

The obtained results are shown in Table 4.

TABLE 4

Change of Dimension of Mouth Portion

|  | Example 2 | Comparative Example 3 (non-irradiated product) |
| --- | --- | --- |
| Dimension Shrinkage (%) in Radial Direction | 0.05 | 1.81 |
| Dimension Shrinkage (%) in Axial Direction | 0.04 | 0.96 |
| Compression Strength (kg/cm$^2$) | 1060 | 552 |

EXAMPLE 3

A mouth portion-reinforced vessel was prepared by performing irradiation with electron beams in the same manner as described in Example 2 except that a crosslinking agent shown in Table 5 was used instead of divinylbenzene used in Example 2. The obtained vessel was tested in the same manner as described in Example 2. The obtained results are shown in Table 5.

EXAMPLE 4

The coating procedures of Example 2 were repeated in the same manner except that a solution comprising 70 parts of divinylbenzene, 30 parts of styrene and 5 parts of benzophenone was coated instead of divinylbenzene used in Example 2. The coated vessel was heated in an oven maintained at 50° C. The thickness of the coating layer was about 10 μm. The coated vessel was irradiated for about 1 minute with ultraviolet rays emitted from a high-pressure mercury lamp (30 W/cm) formed of a quartz tube.

The physical properties of the mouth portion of the obtained vessel were substantially the same as those of the mouth portion of the vessel obtained in Example 2.

EXAMPLE 5

In a pipe extrusion apparatus comprising an extruder for inner and outer layers, provided with a full-flighted screw having a diameter of 65 mm and an effective length of 1430 mm, an extruder for an intermediate layer, provided with a full-flighted screw having a diameter of 50 mm and an effective length of 1100 mm, and a three-layer-forming annular die, polyethylene terephthalate (PET) having an intrinsic viscosity of 1.0 was supplied to the extruder for inner and outer layers, and a PET composition comprising 100 parts of the same PET as described above, 3 parts of ethylene-bis-diallylisocyanurate and 2 parts of diallylglycidyl isocyanurate was supplied into the extruder for an intermediate layer. A two-resin three-layer laminate pipe was extruded into water through the die to cool the pipe. The formed pipe had an outer diameter of 30 mm and an inner diameter of 22 mm, and the inner layer had a thickness of 2.3 mm, the outer layer had a thickness of 1.2 mm and the intrermediate layer had a thickness of 0.5 mm. The pipe was cut into a predetermined size (length=129 mm, weight=55 g). One end of the pipe was heated at about 220° C. and a semi-spherical bottom portion was formed by closing. The other end was heated at 150° C. to promote crystallization in the neck portion, and a screw portion and a neck ring were formed, whereby a preform having a total height of 146 mm was prepared.

The preform was heated at 105° C. and subjected to substantially simultaneous biaxial draw-blow forming by drawing the preform in the lateral direction by blowing while stretching the preform in the longitudinal direction in a blow mold, whereby a multi-layer drawn bottle having an inner volume of 1500 cc was obtained.

The multi-layer drawn bottle was irradiated with electron beams at 10.0 Mrad by using a scanning type electron beam irradiation apparatus having an electron beam acceleration voltage of 300 KV. Whitening or the like was not observed in the irradiated vessel, and the vessel was excellent in the transparency. The heat resis-

TABLE 5

| Sample No. | Crosslinking Agent | Shrinkage (%) in Radial Direction | Shrinkage (%) in Axial Direction | Compression Strength (kg/cm$^2$) |
| --- | --- | --- | --- | --- |
| 1 | diallyl phthalate | 0.04 | 0.03 | 1350 |
| 2 | ethylene glycol dimethacrylate | 0.04 | 0.03 | 1080 |
| 3 | ethylene glycol diallylcarbonate | 0.04 | 0.03 | 1290 |
| 4 | diallyl phthalate prepolymer plus styrene | 0.02 | 0.01 | 1680 |
| 5 | glycidyl methacrylate | 0.03 | 0.02 | 1220 |
| 6 | triallyl isocyanurate plus methyl methacrylate | 0.03 | 0.02 | 1150 | tance and pressure resistance were determined in the same manner as described in Example 1. The obtained results are shown in Table 6.

For comparison, a multi-layer drawn bottle was prepared in the same manner as described in Example 5 except that polyethylene terephthalate (PET) having an intrinsic viscosity of 1.0, which was the same as PET for the inner and outer layers, was supplied to the extruder for the intermediate layer. The vessel irradiated with electron beams at 10.0 Mrad (Comparative Example 4) and the non-irradiated vessel (Comparative Example 5) were similarly tested. The obtained results are shown in Table 6.

TABLE 6

| | Filling Temperature (°C.) | | | |
|---|---|---|---|---|
| | 50 | 70 | 80 | 90 |
| Heat Resistance (volume shrinkage, %) | | | | |
| Example 5 | 0.0 | 0.5 | 1.1 | 3.1 |
| Comparative Example 4 | 0.1 | 1.8 | 8.4 | 31.2 |
| Comparative Example 5 | 0.1 | 1.8 | 8.3 | 31.3 |
| Compression Strength (kg/cm$^2$) | | | | |
| Example 5 | 45.0 | 43.5 | 41.0 | 39.8 |
| Comparative Example 4 | 42.1 | 20.8 | 10.5 | — |
| Comparative Example 5 | 42.0 | 21.0 | 8.8 | — |

EXAMPLE 6

A preform having a length of 110 mm, an inner diameter of 25 mm and a thickness of 2.0 mm was prepared from polyethylene terephthalate (PET) having an intrinsic viscosity of 0.7 by using a multi-staged injection forming machine, and a PET composition comprising 100 parts of the above-mentioned PET, 5 parts of hexamethylene bisdiallylisocyanurate and 4 parts of hexaallyltrimellitic acid amide was injection-formed on the outer surface of the preform to obtain a multi-layer preform having a barrel portion thickness of 3.5 mm. The multi-layer preform was heated at a temperature of 105° C. and then subjected to draw-blow forming to obtain a multi-layer bottle having an average barrel portion thickness of 300 μm and an inner volume of 1500 cc. The multi-layer draw-blown bottle was irradiated with electron beams at 15 Mrad by a scanning type electron beam irradiation apparatus having ane electron beam acceleration voltage of 300 KV. The irradiated vessel was lightly yellowish and transparent. The heat resistance and the heat-resistant compression strength were determined in the same manner as in Example 1. For comparison, the non-irradiated vessel (Comparative Example 6) was similarly tested. The obtained results are shown in Table 7.

TABLE 7

| | Filling Temperature (°C.) | | | |
|---|---|---|---|---|
| | 50 | 70 | 80 | 90 |
| Heat Resistance (volume shrinkage, %) | | | | |
| Example 6 | 0.0 | 0.5 | 1.1 | 4.0 |
| Comparative Example 6 | 0.1 | 1.7 | 8.3 | 30.0 |
| Heat-Resistant Compression Strength (kg/cm$^2$) | | | | |
| Example 6 | 42.0 | 41.0 | 37.0 | 30.6 |
| Comparative Example 6 | 40.5 | 30.0 | 21.0 | measurement impossible |

EXAMPLE 7

According to the coinjection forming method, polyethylene terephthalate having an intrinsic viscosity of 0.75 was injected and after the lapse of 1.5 seconds, a resin composition comprising 100 parts of polyethylene terephthalate having an intrinsic viscosity of 0.80 and 5 parts of epoxy acrylate was injected into the preliminary injected resin to form a multi-layer preform having a length of about 125 mm, an outer diameter of 38 mm and a thickness of 5 mm. The preform was heated in a heating pot and at the subsequent draw-blow formig station the preform was subjected to draw-blow forming to obtain a mutli-layer draw-blown PET vessel having a thickness of 0.4 mm and an inner volume of 1800 ml. The vessel was irradiated with electron beams at 20 Mrad by a scanning type electron beam irradiaton apparatus having an electron beam acceleration voltage of 300 KV. The appearance of the vessel was not changed by the irradiation, and the vessel was excellent in the heat resistance and the heat-resistant compression strength. The results of the determination of the heat resistance and compression strength of the vessel as well as those of the non-irradiated vessel (Comparative Example 7) are shown in Table 8.

TABLE 8

| | Filling Temperature (°C.) | | | |
|---|---|---|---|---|
| | 50 | 70 | 80 | 90 |
| Heat Resistance (volume shrinkage, %) | | | | |
| Example 7 | 0 | 0.3 | 1.0 | 3.0 |
| Comparative Example 7 | 0.1 | 1.7 | 8.3 | 30.0 |
| Heat-Resistant Compression Strength (kg/cm$^2$) | | | | |
| Example 7 | 42 | 41 | 39 | 35 |
| Comparative Example 7 | 40.5 | 30.0 | 21.0 | measurement impossible |

EXAMPLE 8

In a pipe extrusion apparatus comprising an extruder for inner and outer layers, provided with a full-flighted screw having a diameter of 65 mm and an effective length of 1430 mm, an extruder for a first intermediate layer, provided with a full-flighted screw having a diameter of 50 mm and an effective length of 1100 mm, an extruder for second and fourth intermediate layers, provided with a full-flighted screw having a diameter of 32 mm and an effective length of 1100 mm, an extruder for a third intermediate layer, provided with a full-flighted screw having a diameter of 32 mm and an effective length of 1100 mm, and a 6-layer annular die, polyethylene terephthalate (PET) having an intrinsic viscosity of 1.0 was supplied to the extruder for inner and outer layers, a PET composition comprising 100 parts of the same PET as described above, 3 parts of ethylenebisdiallylisocyanurate and 2 parts of diallylglycidyl cyanurate was supplied to the extruder for a first intermediate layer, a copolymer nylon was supplied to the extruder for second and fourth intermediate layers, and an ethylene/vinyl alcohol copolymer (vinyl alcohol content=70 mole%) was supplied into the extruder for a third intermediate layer, whereby a 4-resin 6-layer laminate pipe was obtained. A preform having a total height of 146 mm was formed from this pipe in the same manner as described in Example 5. In this preform, the thicknesses of the outer layer, the first intermediate layer, the second and fourth intermediate layers, the third intermediate layer and the inner layer were 1.0 mm, 0.5 mm, 0.1 mm, 0.5 mm and 2.0 mm, respectively.

The preform was heated at 105° C., and in a blow mold the preform was stretched in the axial direction and simultaneously drawn in the lateral direction by blowing to effect substantially simultaneous biaxial draw-blow forming and obtain a multi-layer drawn bottle having an inner volume of 1500 cc.

The multi-layer drawn bottle was irradiated with electron beams at 10.0 Mrad by using a scanning type electron beam irradiation apparatus having an electron beam acceleration voltage of 300 KV. Whitening or the like was not observed in the irradiated vessel, and the vessel was excellent in the transparency. The heat resistance and compression strength were determined in the same manner as described in Example 1. The obtained results are shown in Table 9.

TABLE 9

| Filling Temperature (°C.) | Volume Shrinkage (%) | Compression Strength (kg/cm$^2$) |
|---|---|---|
| 50 | 0.0 | 45.0 |
| 70 | 0.2 | 44.5 |
| 80 | 0.5 | 43.5 |
| 97 | 1.5 | 41.0 |

What is claimed is:

1. A multi-layer polyester vessel formed of a thermoplastic polyester and having an improved dimension stability, which comprises a laminate including an inner surface layer formed of a thermoplastic polyester and a layer formed on the outer side of said inner surface layer, said outer layer being composed of a crosslinked product of a composition comprising a thermoplastic polyester and a compound having at least two ethylenically unsaturated groups, oxirane rings, or both, in one molecule or a prepolymer thereof, and wherein the said compound is at least one member selected from the group consisting of (i) divinyl compounds, (ii) allyl compounds represented by the general formula:

wherein R stands for an organic group having a valency of 2 to 4, and n is a number of 2 to 4, (iii) allyl acrylates and allyl methacrylates, (iv) bisacrylamides and bismethacrylamides, and (v) compounds represented by the following formula:

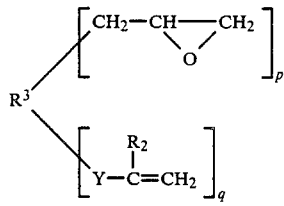

wherein R$^3$ stands for an organic group having a valency of p+q, R$_2$ stands for a hydrogen atom or a methyl group, and p and q are positive integers with the proviso that p is an interger of at least 1 and the sum of p and q is at least 2.

2. A multi-layer polyester vessel as set forth in claim 1 wherein said composition comprises 100 parts by weight of the thermoplastic polyester and 0.1 to 20 parts by weight of said compound or prepolymer.

3. A multi-layer polyester vessel as set forth in claim 1 wherein a gas-barrier layer formed of an ethylene/vinyl alcohol copolymer is interposed between the inner surface layer of the thermoplastic polyester and the layer of the crosslinked product.

4. A multi-layer polyester vessel as set forth in claim 1 wherein the said compound comprises divinyl benzene.

5. The multi-layer polyester vessel of claim 1 wherein said compound comprises an allyl compound selected from the group consisting of diallyl phthalate, diallyl isophthalate, diallyl adipate, diallyl glycolate, diallyl maleate, diallyl sebacate, triallyl phosphate, triallyl aconitate, allyl trimellitate and allyl pyromellitate.

6. The multi-layer polyester vessel as set forth in claim 1 wherein said compound comprises allyl acrylate or allyl methacrylate.

7. The multi-layer polyester vessel as set forth in claim 1 wherein said compound comprises N,N'-methylene-bisacrylamide or N,N'-methylene-bis-methacrylamide.

8. A multi-layer polyester vessel as set forth in claim 1 wherein said compound comprises allyl glycidyl ether, glycidyl methacrylate, glycidyl 2-methylacrylate, glycidyl 2-butylacrylate, glycidyl crotonate, 2,2-bis(3-allyl-4-glycidyloxyphenyl)propane, 1,1-bis(3-allyl-4-glycidyloxyphenyl)cyclohexane, (2-allylphenyl)-glycidyl ether, (2,6-diallylphenyl)glycidyl ether, 1,4-diglycidyloxy-2,6-diallylbenzene, 2,2-bis(3,5-diallyl-4-glycidyloxyphenyl)propane, (2,4,6-triallylphenyl)glycidyl ether, 3,3'-diallyl-4,4'-diglycidyloxybenzophenone, bis(3-allyl-4-glycidyloxyphenyl)-ether and bis(3,5-diallyl-4-glycidyloxyphenyl)sulfone.

9. A multi-layer polyester vessel as set forth in claim 1 wherein the thermoplastic polyester of said inner surface layer and said outer layer is composed of polyethylene terephthalate.

10. A multi-layer polyester vessel as set forth in claim 9 which is a biaxially draw-formed bottle.

11. A multi-layer polyester vessel as set forth in claim 1 wherein said outer layer of said laminate is present over substantially the entire outer side of said inner surface layer.

12. A multi-layer polyester vessel as set forth in claim 1 wherein said outer layer has a thickness of from 1 to 50 microns.

13. A process for the preparation of a multi-layer polyester vessel which comprises forming a preform comprising a laminate having a layer of a thermoplastic polyester and a layer of a composition comprising a thermoplastic polyester and a compound having at least two ethylenically unsaturated groups, oxirane rings, or both, in one molecule or a prepolymer thereof, said compound being at least one member selected from the group consisting of (i) divinyl compounds, (ii) allyl compounds represented by the general formula:

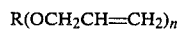

wherein R stands for an organic group having a valency of 2 to 4, and n is a number of 2 to 4, (iii) allyl acrylates and allyl methacrylates or mixtures thereof, (vi) bisacrylamides and bismethacrylamides and (v) compounds represented by the following:

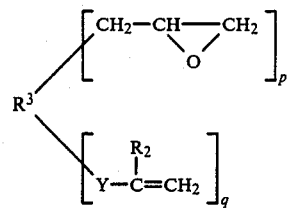

wherein $R^3$ stands for an organic group having a valency of $p+q$, $R_2$ stands for a hydrogen atom or a methyl group, and p and q are positive integers with the proviso that p is an integer of at least 1 and the sum of p and q is at least 2, draw-forming said laminate preform into a vessel so that the thermoplastic polyester layer is located on the inner surface side of the vessel and the composition layer is located on the outer side of the thermoplastic polyester layer, and irradiating the formed vessel with ionizing radiant rays or ultraviolet rays to effect crosslinking of the composition layer.

14. The process of claim 13 wherein said composition layer comprises from 0.1 to 20 parts by weight of crosslinking agent per 100 parts by weight of the thermoplastic polyester.

* * * * *